United States Patent [19]

Fawcett et al.

[11] 4,385,498
[45] May 31, 1983

[54] METHOD FOR CONVERTING ONE FORM OF ENERGY INTO ANOTHER FORM OF ENERGY

[75] Inventors: Sherwood L. Fawcett, Columbus; James N. Anno, Cincinnati, both of Ohio

[73] Assignee: Battelle Development Corporation, Columbus, Ohio

[21] Appl. No.: 154,264

[22] Filed: May 29, 1980

[51] Int. Cl.³ .............................................. F02C 1/04
[52] U.S. Cl. ........................................ 60/650; 60/649
[58] Field of Search ................. 60/325, 370, 643, 645, 60/649, 650, 682, 721

[56] References Cited

U.S. PATENT DOCUMENTS

| | | | |
|---|---|---|---|
| 3,859,789 | 1/1975 | Fawcett et al. | 60/325 |
| 3,938,337 | 2/1976 | Fawcett et al. | 60/721 |
| 4,041,708 | 8/1977 | Wolff | 60/649 |
| 4,117,696 | 10/1978 | Fawcett et al. | 60/325 |
| 4,155,224 | 5/1979 | Hopping | 60/370 |
| 4,179,885 | 12/1979 | Hopping et al. | 60/370 |
| 4,196,594 | 4/1980 | Abom | 60/649 |
| 4,280,325 | 7/1981 | Fawcett et al. | 60/370 |

FOREIGN PATENT DOCUMENTS 2812429 10/1979 Fed. Rep. of Germany ........ 60/650

Primary Examiner—A. Michael Chambers
Attorney, Agent, or Firm—Thomas H. Murray; Clifford A. Poff

[57] ABSTRACT

Method for converting one form of energy into another form of energy by isobarically heating a gas, adiabatically expanding the gas while converting the heat energy of the gas into the kinetic energy of a moving body, converting the kinetic energy of the moving body into another form of energy, and approximately isothermally compressing the gas to a higher pressure. Improved efficiency is achieved by virtue of the fact that this system employs approximately isothermal compression, which is preferably achieved by injecting liquid into an adiabatically-expanded gas, thereby effecting a thermodynamic cycle which more closely approximates the efficiency of a Carnot cycle.

11 Claims, 7 Drawing Figures

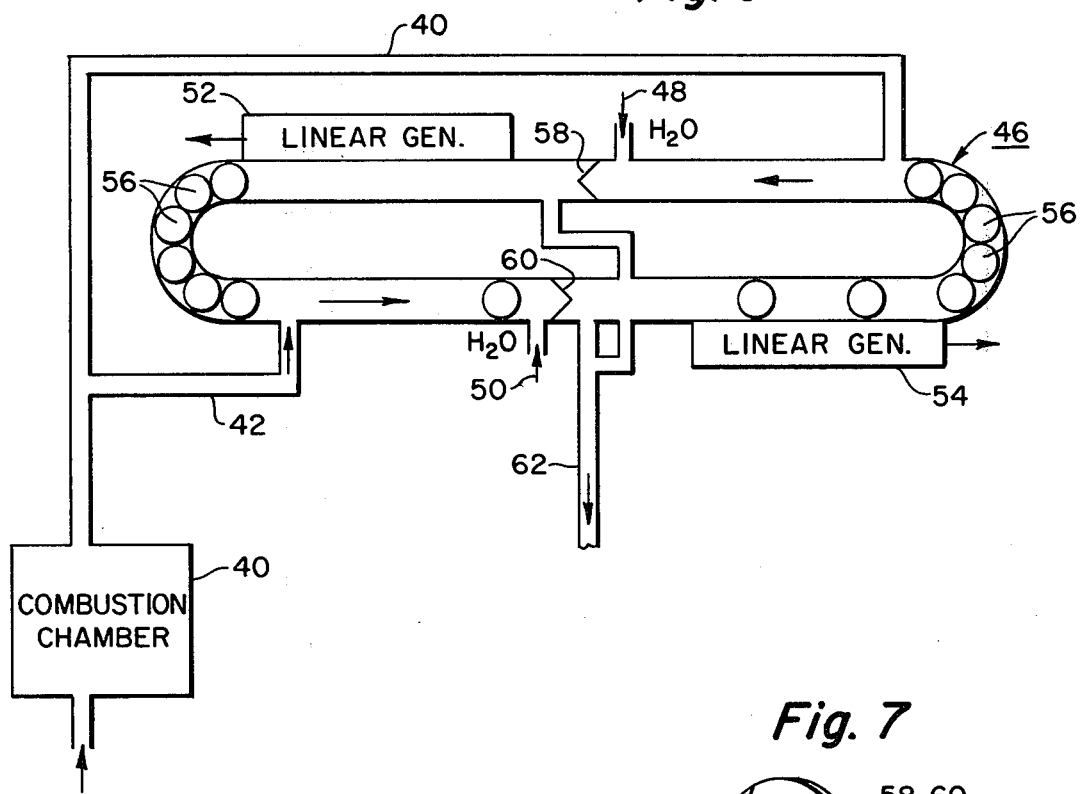
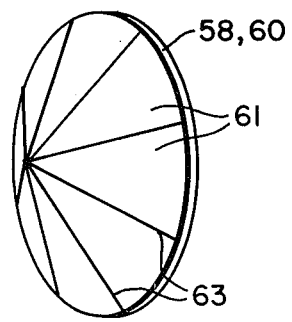

METHOD FOR CONVERTING ONE FORM OF ENERGY INTO ANOTHER FORM OF ENERGY

BACKGROUND OF THE INVENTION

While the present invention is not limited to any particular type of energy converter, it will be described herein in connection with a unidirectional energy converter such as that shown in U.S. Pat. No. 3,859,789, issued Jan. 14, 1975. In an energy converter of this type, a closed, continuous loop passageway contains a plurality of freely-movable bodies which travel around the passageway in one direction only. Force is applied to successive ones of the bodies in one region of the passageway to thereby propel them around the passageway. At points around the passageway, at least a portion of the kinetic energy of the propelled bodies is converted into another form of energy. Thereafter, successive ones of the bodies are returned back to the starting region where they are again propelled in one direction by application of a force thereto. The unidirectional energy converter shown in the aforesaid patent may be operated in accordance with various well-known thermodynamic cycles such as the Brayton, Otto and Diesel cycles. Such thermodynamic cycles employ adiabatic expansion of a gas during the power stroke. This is followed by an exhaust stroke, during which heat is rejected, and adiabatic compression back to a higher pressure. With isothermal compression of a gas, however, variations can be visualized in thermodynamic cycles which more closely approximate the Carnot cycle.

SUMMARY OF THE INVENTION

In accordance with the present invention, a method for operating an energy converter is provided which employs a thermodynamic cycle of higher efficiency than conventional cycles by virtue of the fact that approximately isothermal compression of a gas is employed during part of the cycle rather than adiabatic compression. Such isothermal compression can be approximated by injecting into the gas, at the completion of adiabatic expansion, a fluid such as water at a temperature that is preferably approximately equal to that of the expanded gas.

In one embodiment of the invention, the cycle is comprised of isobaric (i.e., constant pressure) heating and expansion, adiabatic expansion, and approximately isothermal compression. The advantage of this cycle is that it can utilize hot air at atmospheric pressure and thus has important applications in waste-heat utilization from low-temperature hot air. In another embodiment of the invention, the cycle is comprised of adiabatic compression, isobaric heating and expansion, adiabatic expansion and finally approximately isothermal compression. The primary advantage of this cycle is a thermodynamic efficiency greater than the Brayton cycle for similar temperature-pressure ranges and potentially significantly higher than other practical cycles currently in use.

In the case of a unidirectional energy converter such as that shown in U.S. Pat. No. 3,859,789, which employs freely-movable bodies within a continuous loop passageway, hot gas at ambient pressure is introduced into the expander region of the passageway and is then expanded adiabatically below ambient pressure. As the working body within the passageway nears the end of the expander section, a liquid such as water at a temperature that is preferably approximately equal to the temperature of the expanded gas is sprayed into the expander section. The gas-liquid mixture ahead of the ensuing piston is then compressed approximately isothermally to ambient pressure and expelled from the expander section when the expander section exit port is opened by the passage of the preceding piston. The liquid is then separated from the gas by a centrifugal separator and the heat is removed by a heat exchanger.

The above and other objects and features of the invention will become apparent from the following detailed description taken in connection with the accompanying drawings which form a part of this specification, and in which.

Figure 1:
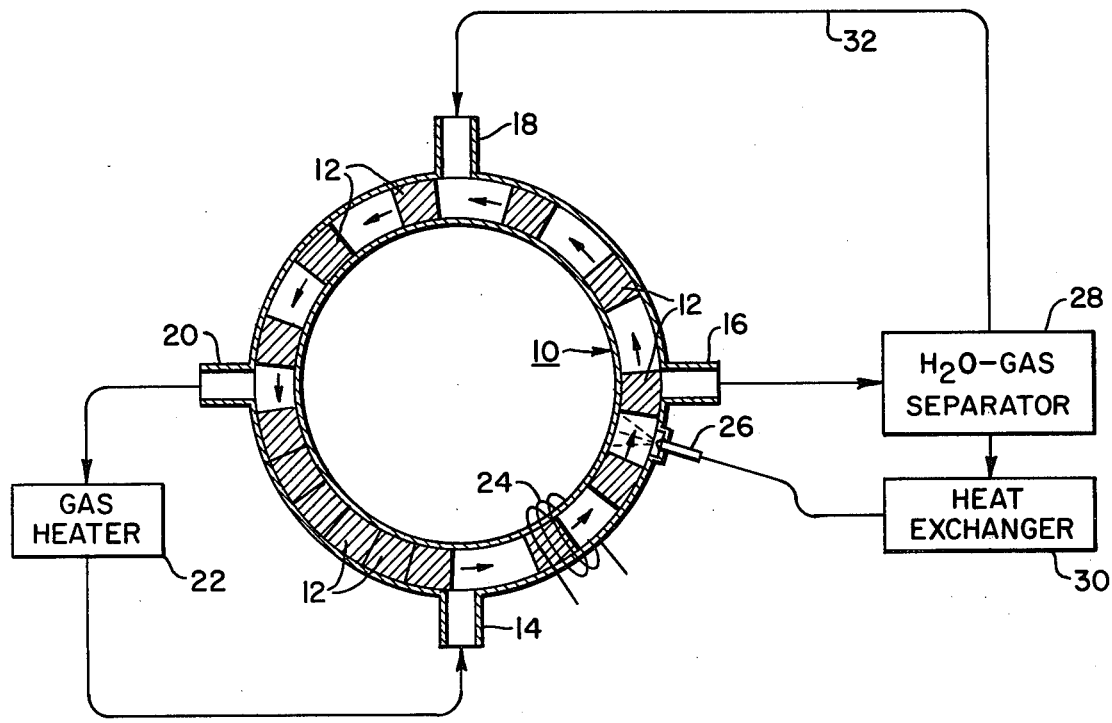
FIG. 1 is a schematic illustration of one embodiment of the invention which employs both adiabatic compression as well as approximately isothermal compression.
Figure 4:
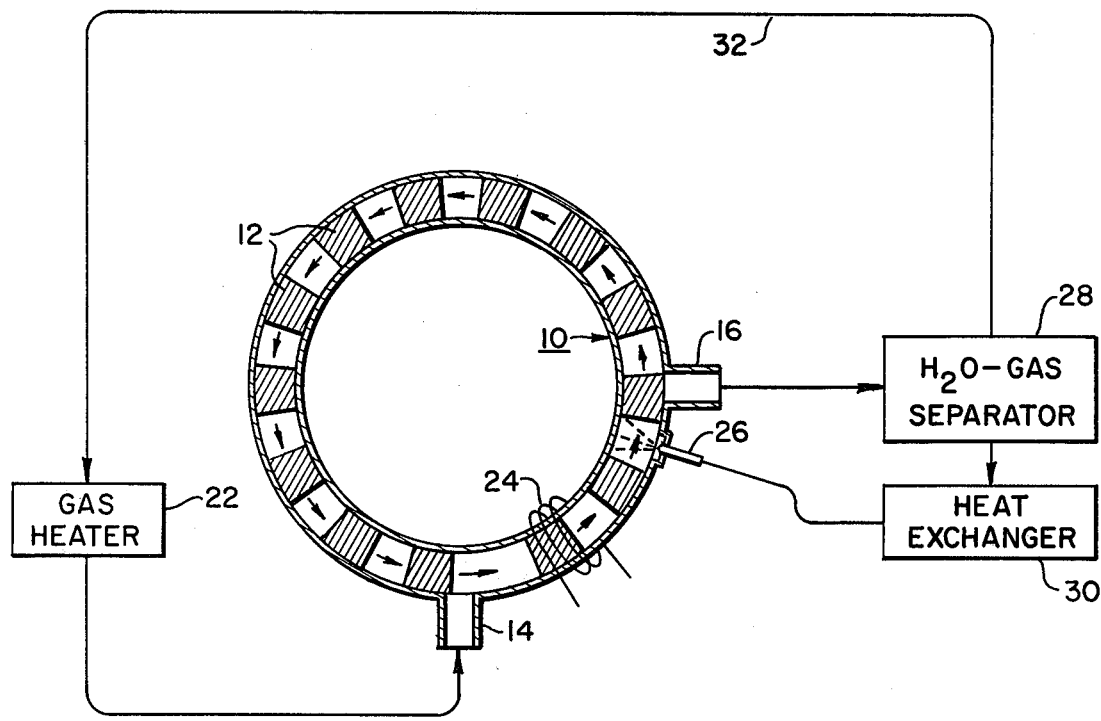
Figure 5:
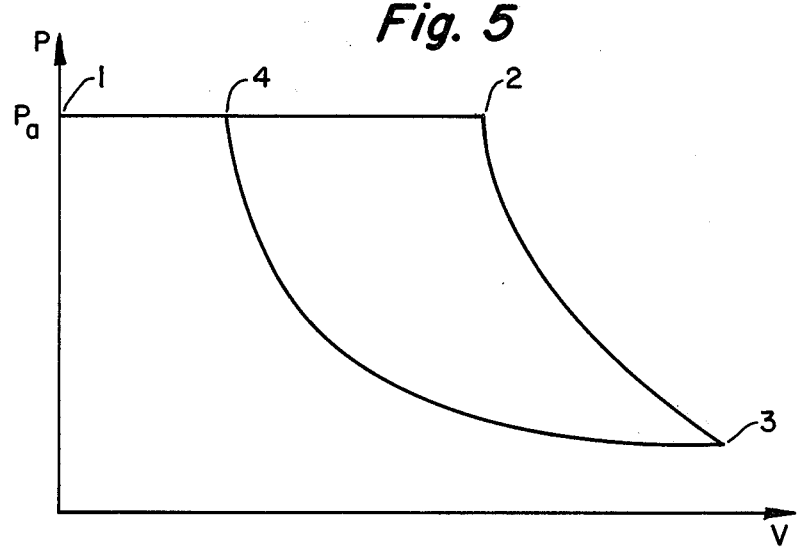

FIGS. 3A–3D schematically illustrate the action on a unit gas cell between successive pistons in the expander section of the unidirectional energy converter shown in FIG. 1;

FIG. 4 is an illustration of another embodiment of the invention wherein approximately isothermal compression is employed without being followed by adiabatic compression;

FIG. 5 is a pressure-volume diagram illustrating the thermodynamic cycle of the apparatus of FIG. 4;

FIG. 6 is an illustration of a further embodiment of the invention employing dual expander regions and gates; and FIG. 7 is a perspective view of the gate device utilized in the embodiment of FIG. 6.

With reference now to the drawings, and particularly to FIG. 1, a unidirectional energy converter is shown comprising a closed-loop, circular passageway 10 having a plurality of freely-movable bodies or pistons 12 therein. The pistons may comprise cylindrical, curved elements having a radius of curvature corresponding to the radius of curvature of the closed-loop passageway 10. Alternatively, the pistons 12 may comprise spheres or other geometries conforming to the geometry of the passageway. The tolerance or clearance between the surfaces of the pistons 12 and the inside walls of the closed-loop passageway 10 is such as to permit the pistons to move freely through the passageway. However, fluid flow past the pistons within the passageway is substantially prevented. Piston rings may be used as required. The continuous, closed-loop passageway 10 is provided with four ports 14, 16, 18 and 20 spaced around the passageway at intervals of about 90°. The region between ports 14 and 16 includes an expander section where hot gases entering port 14 cause successive ones of the pistons 12 to be propelled around the passageway 10 in a counterclockwise direction as viewed in FIG. 1. That is, the hot gases entering port 14 expand adiabatically, imparting kinetic energy in the form of increased forward velocity to each piston 12. After the hot gases are expanded adiabatically, they are then compressed approximately isothermally as will be explained hereinafter.

In the region between ports 16 and 18, the pistons 12 move without acceleration or deceleration except for deceleration caused by frictional forces. Between ports 18 and 20, the unit gas cells between successive pistons are compressed. This compressed gas exits through port 20 and is fed to a gas heater 22 where it is heated and then fed back into port 14 prior to adiabatic expansion. Between ports 20 and 14 is a thruster region where the pistons 12 move downwardly under the force of gravity to the port 14 where they are again propelled in a counterclockwise direction. It should be understood, however, that other forms of force in the thruster region may be employed.

Part of the kinetic energy of the propelled pistons may be extracted by means of electromagnetic coils 24 which surround the passageway 10 assuming, of course, that the pistons 12 are formed from a magnetically-permeable material such as iron. Other materials and other forms of energy extraction may also be used. Beyond the region of energy extraction, shown as coil 24, but ahead of the port 16 is a nozzle 26 adapted to spray a liquid, such as water, into the interior of the passageway 10. The mixture of liquid vapor and gas is exhausted through port 16 to a liquid-gas separator 28. The separated liquid is then fed to a heat exchanger 30 where heat is extracted and then back to the nozzle 26. On the other hand, the separated gas is applied through conduit 32 to port 18 where it is again compressed in the region between ports 18 and 20. It will be appreciated, of course, that the air/liquid mixture from port 16 can simply be exhausted to the atmosphere and that atmospheric air can be drawn into port 18. Likewise, instead of recycling the liquid through a heat exchanger 30, a continuous or new supply of liquid at the proper temperature can be injected into the passageway 10. The coil 24 can be replaced by other types of power take-offs such as that shown in U.S. Pat. No. 4,280,325 or U.S. Pat. No. 3,859,789. In this system, the kinetic energy of the pistons and the spacing (and thus the pressure-volume relations) are interrelated. Therefore, the useful power must be removed in the expander section between ports 14 and 15 and optimally between the liquid spray nozzle 26 and port 16, or an appropriate pressure gate, as described later, must be used at the expander exit.

Figure 2:
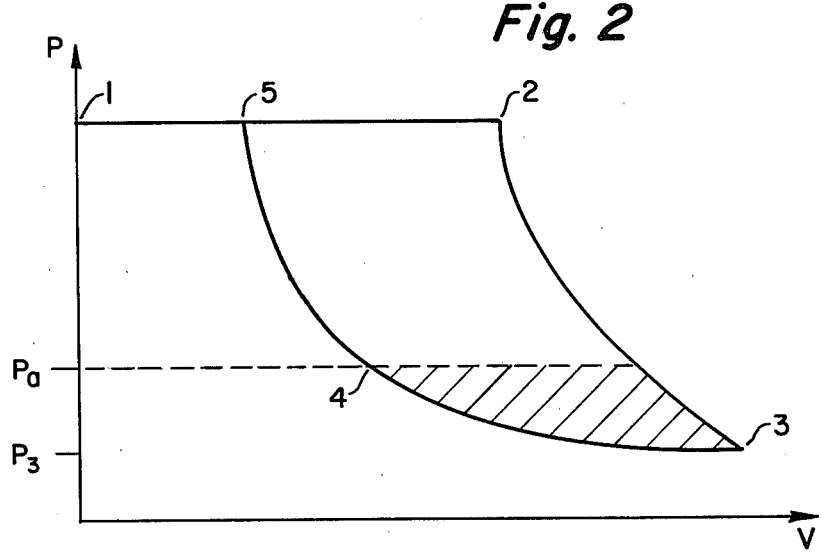
FIG. 2 is a pressure-volume diagram illustrating the thermodynamic cycle of the apparatus of FIG. 1.
Figure 3A:
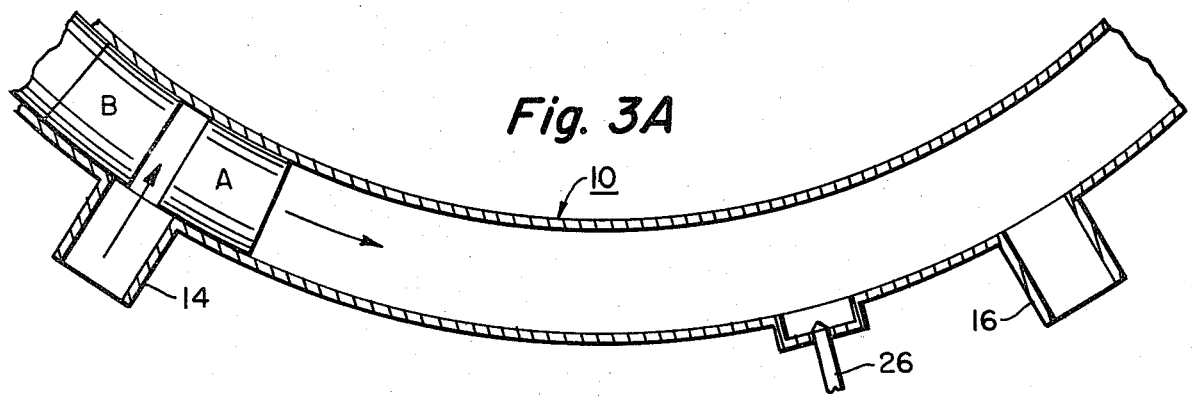
Figure 3B:
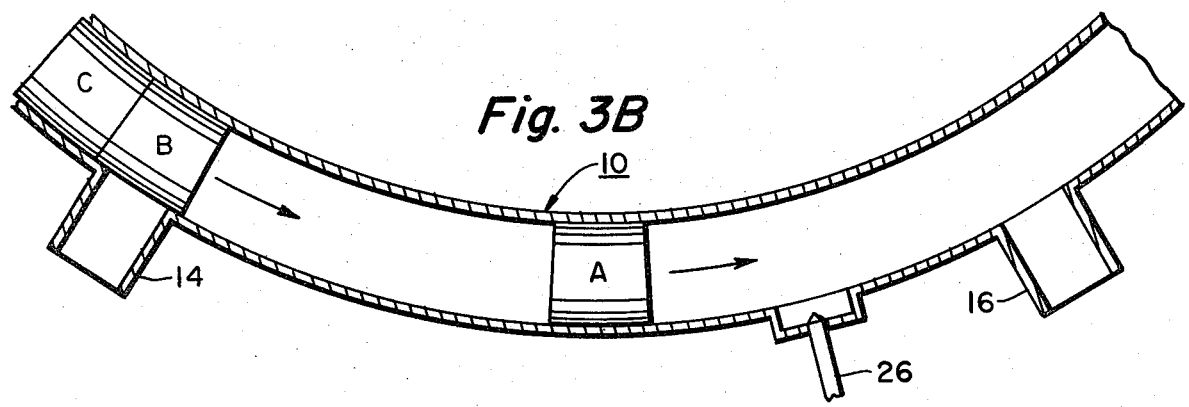
Figure 3C:
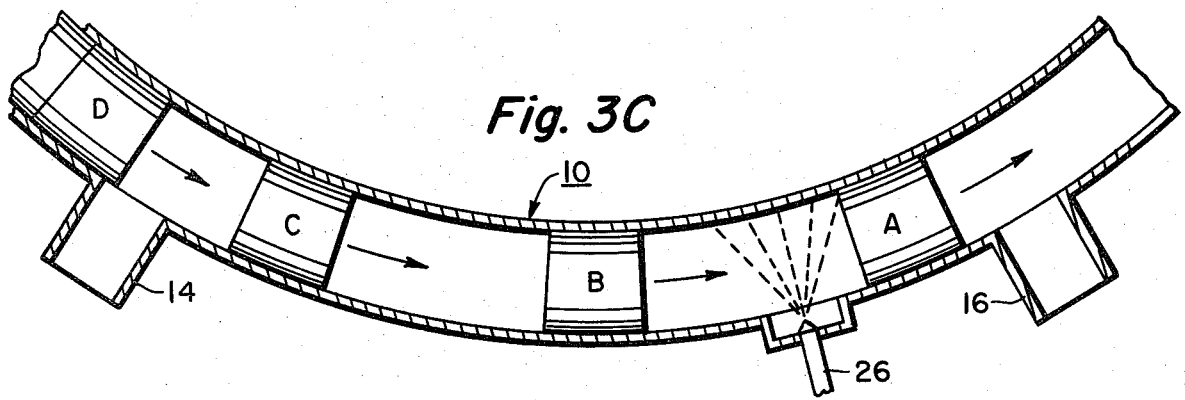
Figure 3D:
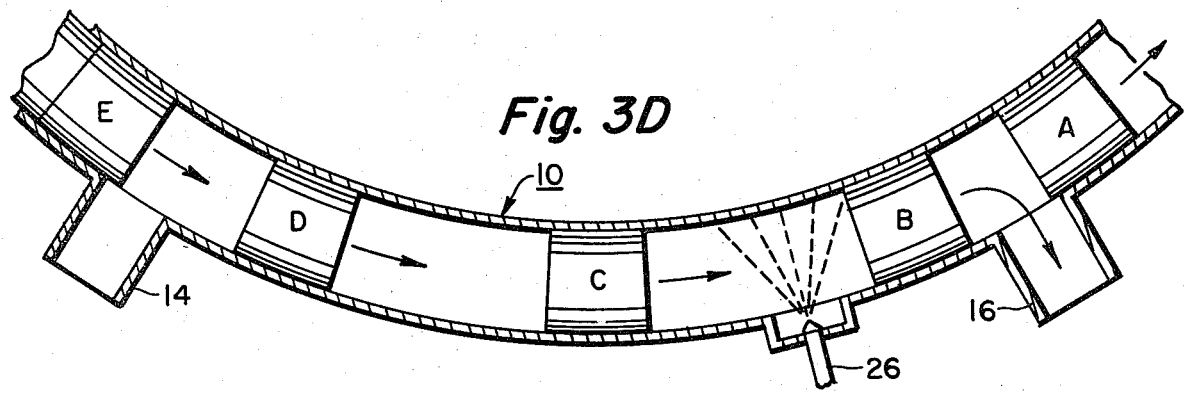

The operation of the unidirectional energy converter of FIG. 1 can best be understood by reference to FIGS. 2 and 3. In FIG. 3, positions of successive ones of the pistons in the region between ports 14 and 16 are shown, the ports in passageway 10 being separated by an angle less than 90° in FIGS. 3A-3D for illustrative purposes only. In the thruster region between ports 20 and 14, the unit gas cell between successive pistons is collapsed to essentially zero volume at point 1 shown in the P-V diagram of FIG. 2. The hot, high pressure gas from gas heater 22 then enters the inlet port 14 and expands the lead piston (piston A in FIGS. 3A-3D) at constant pressure to point 2 in FIG. 2, until the trailing piston B (FIG. 3B) seals off the unit cell. The unit cell now undergoes adiabatic expansion between points 2 and 3 shown in FIG. 2 to subatmospheric pressure $p_3$ at point 3. At this time (FIG. 3C), the lead piston A moves against the pressure (assumed to be atmospheric pressure) at the outlet 16 and tends to slow down. On the other hand, the trailing piston B sees high pressure behind it and vacuum ahead of it, such that it still accelerates for a period of time. The result is compression of the gas in the unit cell. However, to avoid just climbing back up the adiabatic curve between points 2 and 3 in FIG. 2, a liquid spray from nozzle 26 is injected into the unit cell between pistons A and B. This liquid absorbs the heat of compression, forcing the compression process to be approximately isothermal compression up to atmospheric pressure $p_a$ at point 4 shown in FIG. 2. At this juncture (FIG. 3D), the unit cell exhausts its moist gas through the outlet 16. The liquid is then separated from the gas in separator 28 and the dry gas compressed between ports 18 and 20 where the gas in a unit cell is adiabatically compressed from point 4 to point 5 in FIG. 2. The exhaust gases from port 20 are then exhausted to the heater 22 and the unit cell collapses to point 1 in the thruster region between ports 20 and 14. The gain in the net work of this cycle over the Brayton cycle is shown as the cross-hatched area in the P-V diagram of FIG. 2. Thus, very high efficiencies are possible with the cycle of the invention, approaching the Carnot efficiency. Heat is absorbed by the liquid during isothermal compression. Consequently, the temperature of the liquid entering the unit cell through nozzle 26 should be approximately that of the adiabatically-expanded gas in the unit cell. The temperature of the liquid in the unit cell increases slightly during the approximately isothermal compression, but this temperature is again decreased in the heat exchanger 30 where heat is extracted.

In FIG. 4, another embodiment of the invention is shown in which adiabatic compression is eliminated and points 1, 2 and 5 in FIG. 2 are, in effect, reduced to atmospheric pressure $p_a$. In the embodiment of FIG. 4, the ports 18 and 20 in the continuous, closed-loop passageway 10 are eliminated and the pistons are permitted to move freely without compression of a gas between ports 16 and 14. The gas separated in separator 28 at atmospheric pressure is simply fed back to the gas heater 22. The result is the thermodynamic cycle shown in FIG. 5 wherein isobaric heating occurs between points 2 and 4 in heater 22 followed by adiabatic expansion and then approximately isothermal compression between points 3 and 4. Heat is again extracted by the heat exchanger 30 to lower the temperature of the entering liquid.

In FIG. 6, a further embodiment of the invention is shown which employs two expander regions and two power takeoff stations. Ambient air is introduced into a combustion chamber 40 where it is heated and then fed through conduits 42 and 44 into two expander regions formed in a continuous, closed-loop passageway 46. As in the embodiments of FIGS. 1 and 4, water is sprayed into the expander sections via nozzles 48 and 50; while energy is extracted from the continuous loop passageway by means of a pair of linear generators 52 and 54. As the pistons 56 leave the expander sections, they pass through pressure gates 58 and 60 located just beyond the nozzles 48 and 50. The gates 58 and 60, which may take the form of segmented rubber diaphragms as shown in FIG. 7, act as check valves. That is, the segments 61 will separate along seams 63 to permit a piston 56 to pass through in one direction. After the piston passes through the gate, the segments are forced back into sealing engagement along seams 63 due to the fact that the pressure in the unit cell at the point of water injection is below atmospheric pressure existing at exhaust duct 62. In this respect, the gates assume the function of the piston A in FIG. 3C, for example, and prevent atmospheric air from entering the unit cell in the area adjacent the nozzles 48 and 50. As each piston leaves the expander, it passes through a pressure gate; and behind the piston the pressure gate closes and maintains a pressure below atmospheric in the region of the nozzles 48 and 50. Water is injected at a rate appropriate to the heat rejected by the gas ahead of the piston moving out of the expander to effect approximately isothermal compression as in the previous embodiments of the invention.

Although the invention has been shown in connection with certain specific embodiments, it will be readily apparent to those skilled in the art that various changes in form and arrangement of parts may be made to suit requirements without departing from the spirit and scope of the invention. In this regard, it will be apparent that instead of extracting energy from the moving pistons with the use of an electromagnetic coil such as that shown in FIGS. 1 and 4, any of the methods for extracting energy from a unidirectional energy converter as shown, for example, in the aforesaid U.S. Pat. No. 3,859,789 can be used equally as well.

We claim as our invention:

1. In a method for converting one form of energy into another form of energy, the steps of isobarically heating a gas, adiabatically expanding said gas in a cell between bodies in a continuous-loop passageway while converting the heat energy of the gas into the kinetic energy of at least one moving body of a plurality of bodies in said passageway, converting the kinetic energy of the moving body into another form of energy, and approximately isothermally compressing said gas in said cell to a higher pressure.

2. The method of claim 1 including the step of adiabatically compressing said gas after it is approximately isothermally compressed and prior to isobaric heating of the same.

3. The method of claim 1 wherein said gas is again isobarically heated immediately after approximately isothermal compression of the same.

4. The method of claim 1 wherein said gas is adiabatically expanded to a pressure below atmospheric pressure and then approximately isothermally compressed back to atmospheric pressure.

5. The method of claim 1 wherein approximately isothermal compression of said gas is effected by subjecting the same to a liquid spray.

6. A method for converting one form of energy into a second form of energy which comprises:
(a) providing a closed, continuous loop passageway containing a plurality of movable bodies,
(b) expanding at constant pressure a fluid medium in unit cells between successive ones of said bodies in a first region of said passageway to thereby propel successive ones of the bodies around the passageway, thereby exchanging energy between the gas and the bodies,
(c) continuing expanding said fluid medium in said unit cells in a second region of said passageway by adiabatic expansion of the fluid medium,
(d) approximately isothermally compressing the fluid medium in said unit cells in a third region of the passageway,
(e) exhausting said fluid medium from said passageway in a fourth region of the passageway,
(f) returning successive ones of said bodies through a fifth region of said passageway back to said first region where they are again propelled by expansion of a fluid medium, and
(b) extracting energy from the system by changing kinetic energy from said propelled bodies into other useful forms of energy.

7. The method of claim 6 including the step of heating said fluid medium before it is expanded.

8. The method of claim 6 including the step of adiabatically compressing the fluid mediun in said unit cells after it is approximately isothermally compressed.

9. The method of claim 6 including the step of subjecting said fluid medium in a unit cell to a liquid spray to effect approximately isothermal compression thereof.

10. The method of claim 9 including the step of adjusting the temperature of said liquid spray before the fluid medium is subjected thereto.

11. The method of claim 10 wherein the temperature of said liquid is adjusted to a level approximately equal to that of the fluid medium after it is adiabatically expanded.

* * * * *